United States Patent [19]

Dunder

[11] Patent Number: 5,094,822
[45] Date of Patent: Mar. 10, 1992

[54] OZONE GENERATOR

[76] Inventor: Ove K. Dunder, P.O. Box 13537, Kanata, Ont., Canada, K2K 1X6

[21] Appl. No.: 660,175

[22] Filed: Feb. 26, 1991

Related U.S. Application Data

[63] Continuation-in-part of Ser. No. 535,051, Jun. 8, 1990, abandoned.

[51] Int. Cl.[5] .............................................. B01J 19/08
[52] U.S. Cl. ........................... 422/186.22; 422/186.2; 422/186.21; 422/907
[58] Field of Search ...................... 422/186.07, 186.21, 422/186.22, 186.2, 907

[56] References Cited

U.S. PATENT DOCUMENTS

| | | | |
|---|---|---|---|
| 3,884,819 | 5/1975 | Schultz et al. | 250/533 |
| 3,984,296 | 10/1976 | Richards | 204/157.1 R |
| 4,152,163 | 5/1979 | Innis . | |
| 4,156,653 | 5/1979 | McKnight | 250/533 |
| 4,213,838 | 7/1980 | Lowther | 204/176 |
| 4,666,679 | 5/1987 | Masuda et al. | 422/186.2 |
| 4,877,588 | 10/1989 | Ditzler et al. | 422/186.19 |
| 4,954,321 | 9/1990 | Jensen | 422/186.19 |
| 4,960,570 | 10/1990 | Mechtersheimer | 422/186.21 |
| 4,963,331 | 10/1990 | Mouw | 422/186.18 |
| 4,988,484 | 1/1991 | Karlson | 422/186.19 |
| 5,034,198 | 7/1991 | Kaiga et al. | 422/186.07 |

FOREIGN PATENT DOCUMENTS

| | | | |
|---|---|---|---|
| 930331 | 7/1973 | Canada | 204/176 |
| 1090293 | 11/1980 | Canada | 204/176 |

Primary Examiner—Robert L. Stoll
Assistant Examiner—N. Bhat

[57] ABSTRACT

An improved ozone generator for small portable systems formed in the shape of a replacable module. The high voltage electrode in the center of the generator is of a boxlike construction with one end open towards the generator outlet port and with the sides made from perforated stainless steel in order to supply multiple outlets for the formed ozone from the corona discharge gap, which will reduce the amount of dissociation of ozone and the amount of nitric acids formed. The high voltage electrode is suspended in the center of the generator by means of 4 ceramic spacers. The potential area of surface contamination caused by impurities in the feed gas and leading to generator failure is therefore limited to the said spacers.

The generator has removable thermal pads that are used in order to retain the heat in applications where the generator produces small amounts of ozone, otherwise they are removed to allow for air cooling.

The whole generator assembly is held together with two U-shaped spring clips that can be removed without the use of tools. This makes the cleaning process a fast and efficient operation.

20 Claims, 4 Drawing Sheets

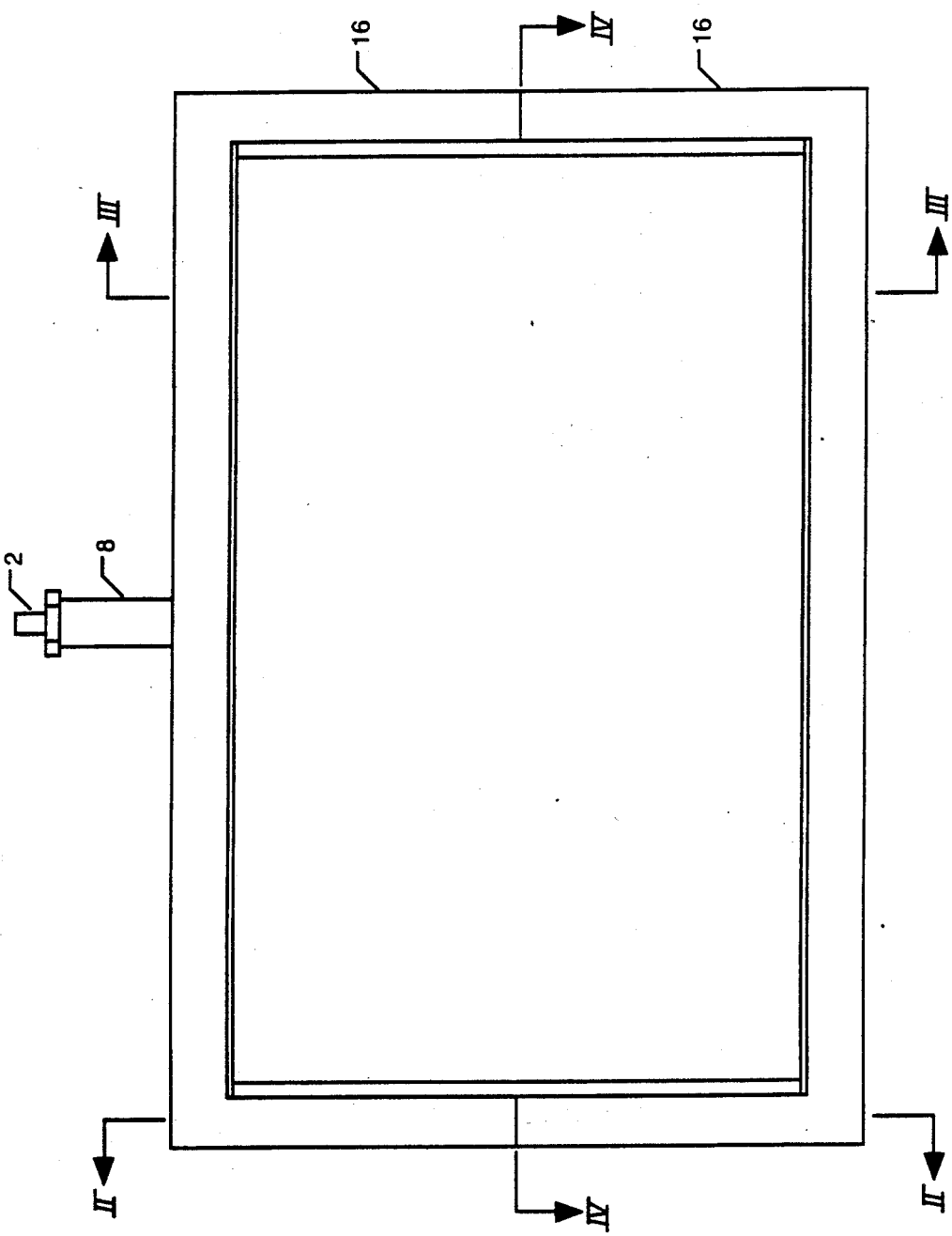
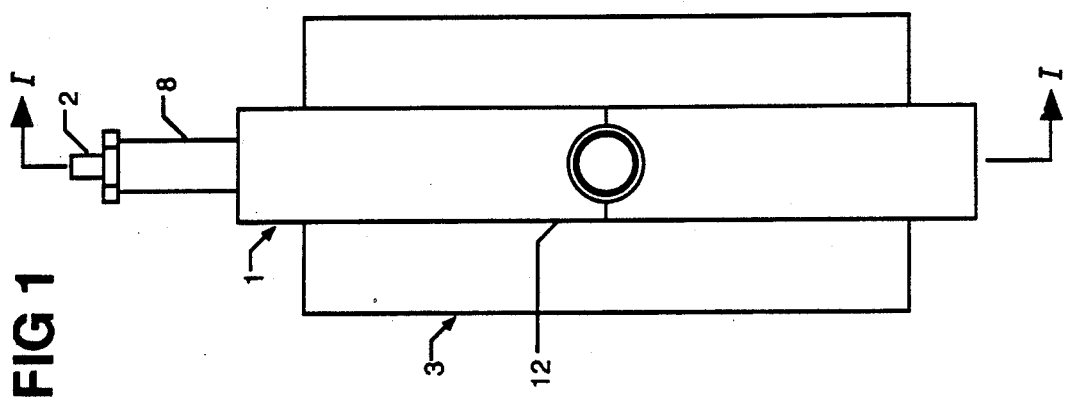

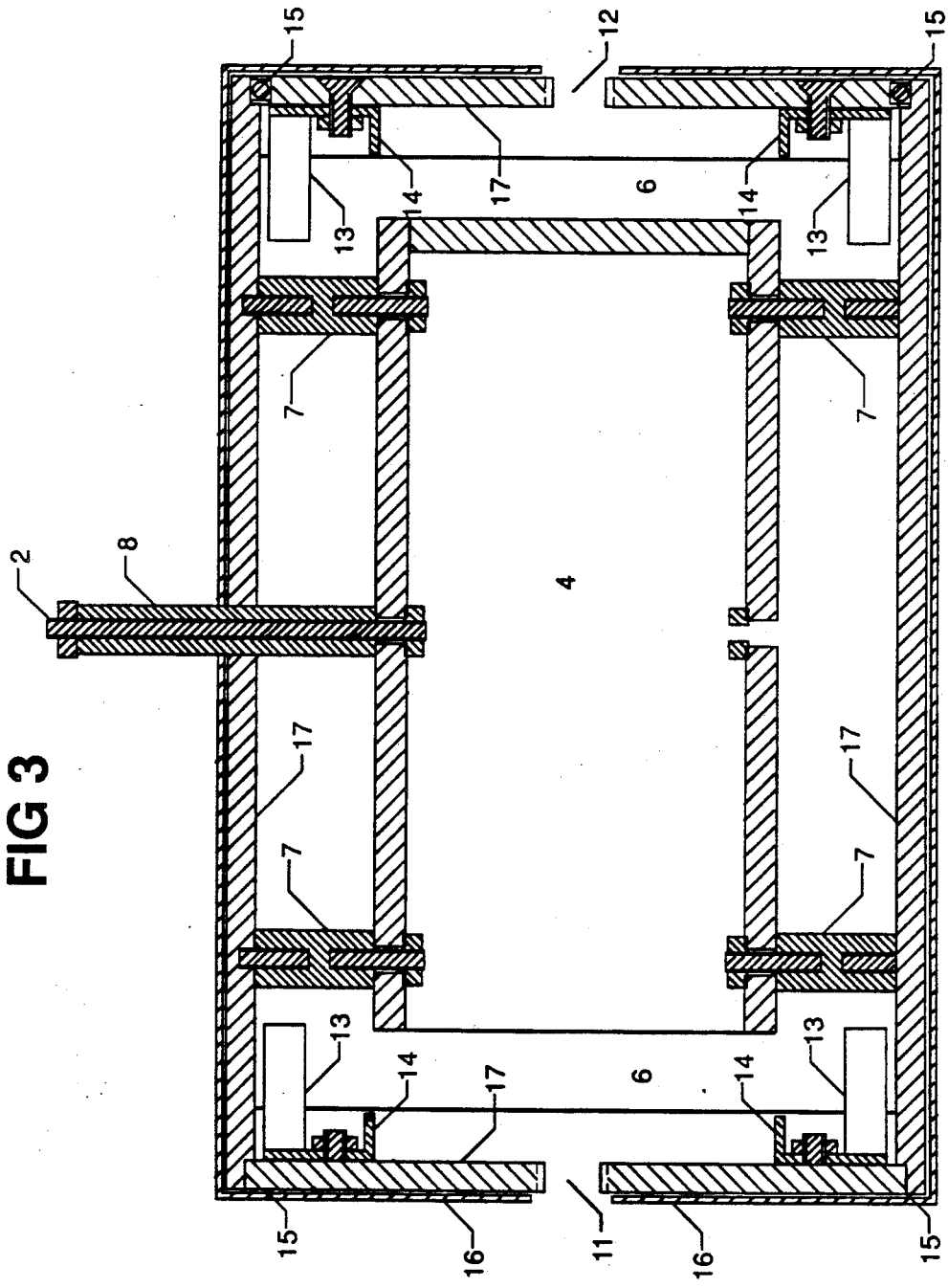

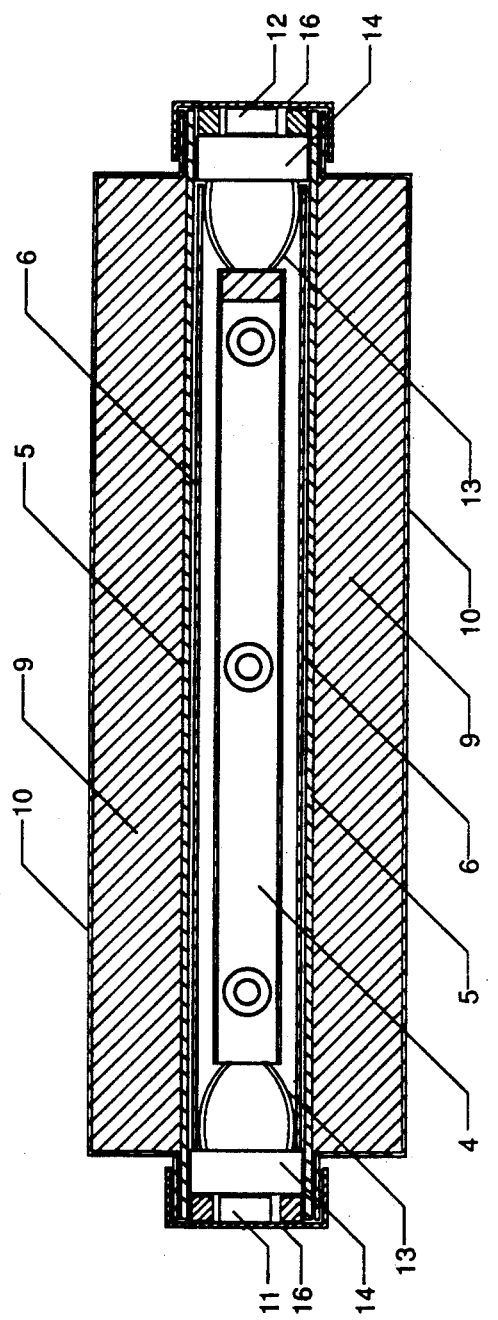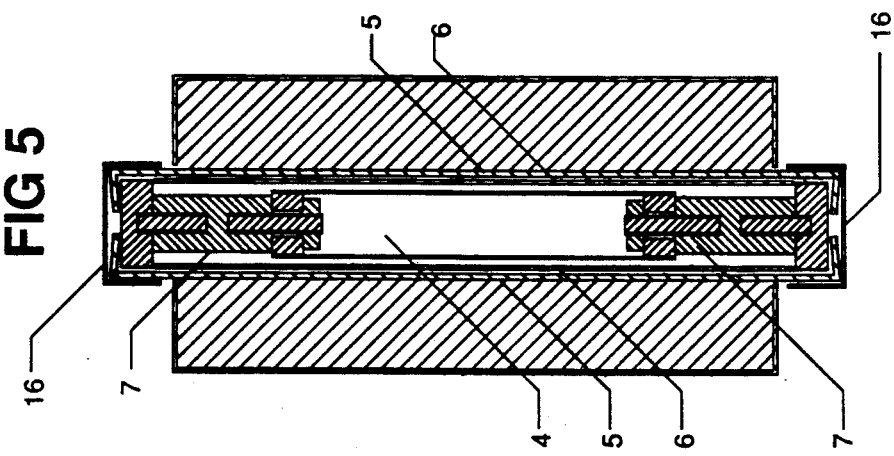

OZONE GENERATOR

This application is a continuation in part of 07/535,051, filed Jun. 8, 1990, now abandoned.

FIELD OF INVENTION

This invention relates to improvements in ozone production reliability and ease of maintenance in ozone generators using the silent corona discharge principle in a flat dielectric member configuration.

BACKGROUND OF INVENTION

Large scale ozone generators (producing over 5 g/hr) generally have the humidity in the feed gas removed by air dryers and the excess heat generated from the corona discharge removed with a liquid cooling system.

All small ozone generators heretofore known, however, due to economical considerations must be able to function without air dryers and temperature controls and therefore suffer from a number of disadvantages:

(a) In generators producing small amounts of zone in relation to the cooling surfaces, little heat build up is realized and the relative humidity in the feed air obtained from most ambient conditions remains high. Consequently nitric acid will build up on the dielectric members. This has been a longfelt but usolved need in the industry.

(b) In all previous ozone generator designs the feed gas has been forced to travel the full length of the discharge gap between the electrodes. The characteristic oxidation time of nitrogen oxides and the consequent formation of nitric acid is approximately 10,000 times longer than that of ozone formation. This allows nitric acid sufficient time to form in the discharge gap.

(c) In all previous ozone generator designs the feed gas has been forced to travel the full length of the discharge gap between the electrodes. A certain percentage of ozone will then dissociate due to electron collisions and heat in the discharge gap.

(d) Contaminants from the feed gas will form a deposit on the surface area connecting the two counter electrodes and reduce the impedance of the generator and eventually load down the transformer below the corona inception voltage or if an insulating material which will form surface tracks is used, the insulator is usually destroyed.

(e) It is common in small ozone generators to use ceramic dielectric members that have various screen printed materials applied to them, which makes them costly to replace.

(f) Since untreated humid air is used, the generator will need periodic removal and cleaning. In most ozone generators this is a difficult process.

(g) It is common in small ozone generators to use the air flow from the distribution fan as a feed gas supply for the ozone generator, this causes the contaminants in the air to be deposited inside the generator and eventually cause it to fail.

(h) It is common in small ozone generators to expose the high voltage connector to the air flow from the distribution fan, this causes contaminants in the air to be deposited on the high voltage connector insulation material decreasing its impedance to ground potential and will eventually load down the high voltage transformer or if an insulating material which will form surface tracks is used, the insulator is usually destroyed.

(i) Small gas-tight ozone generators are commonly expensive to manufacture and difficult to disassemble for cleaning.

OBJECTS AND ADVANTAGES

Accordingly several objects and advantages of the present invention are:

(a) to provide a temperature increase inside the generator as compared to the feed gas temperature by retaining a certain amount of heat through the use of thermal insulation, and therefore keeping the air above its dew point and reducing the amount of nitric acid which is formed.

In installations where a power source has sufficient voltage and current capability and is operating at a high enough frequency to warrant removal of excess heat, then the two insulating members can be removed so that air cooling can be applied against the outside surface areas of the generator.

(b) to provide an alternate passway for the feed gas by using a hollow high voltage electrode with perforated sides and an opening on the discharge end. This will reduce the exposure time of the feed gas in the discharge gap and less nitric oxides will have time to form.

(c) to provide an alternate passway for ozone as it is formed in the discharge gap by using a hollow high voltage electrode with perforated sides and an opening on the generator outlet end. Ozone will still have time to form due to its short formation time constant and the dissociation of ozone due to electron collisions and heat in the discharge gap will be reduced.

(d) to provide a minimum connecting area between the high voltage electrodes and to use nontracking materials such as ceramic and polytetrafluoroethylene.

(e) to provide an economical dielectric such as a standard size ceramic substrate without special coatings.

(f) to provide a generator which is easy to remove, disassemble clean, reassemble and reinstall without use of threaded fasteners and with easily removable dielectrics.

(g) to provide an ozone generator which will accept a small piped in air flow, but which still is economical to manufacture. The feed gas can then be prefiltered.

(h) to provide a design where the high voltage connector sleeve is protected from the air flow from the distribution fan.

(i) to provide an easily manufactured easily disassembled ozone generator which can be used with seals and gaskets in an air-tight version or as a more economical version by leaving out the seals and gaskets.

SUMMARY OF INVENTION

The ozone generator has a high tension electrode and a grounded electrode. The dielectric members are provided on the grounded electrodes so that the electrostatic field is produced between the dielectric members and the center high tension electrode. The grounded electrodes are also the sidewalls of the generator. The center high tension electrode is suspended in the center of the generator by means of 4 ceramic spacers. The potential area for surface contamination caused by impurities in the feed gas and leading to generator failure is therefore limited to the said spacers. Furthermore, the surface area of the spacers is sufficiently small so that a current of a large enough amperage will be caused by any conductive surface layer formed on the spacers and the surface layer will be burnt off.

The high voltage electrode is constructed with a hollow core and with perforated sides thus allowing the feed gas to be removed from the silent corona discharge gap before the formed ozone starts to dissociate and before nitric acid has time to form.

In order to retain the heat in applications where the generator produces small amounts of ozone, the generator has been designed in such a way that insulation such as polystyrene can be added in an easy manner to the outside of the generating chamber. The air flow can also be held to a low value in the range of 1 to 6 l/min since the generator is sealed except for the inlet and outlet ports that has threads for ⅛" pipe fittings and therefore the major part of the gas flow will pass thru the corona discharge gap.

The ceramic dielectrics used are standard untreated stock sizes from the manufacturer in order to facilitate cheap replacement as needed.

The generator is designed in the shape of a cartridge with a banana connector connected to the protruding threaded rod, and it can therefore be inserted into its power supply housing with one easy push and removed with one pull. The whole generator assembly is held together with two U-shaped spring clips that can be removed without the use of tools. This makes the cleaning process a fast and efficient operation.

The generator is constructed in such a fashion that a small air pump with an intake filter is easily used as a feed gas supply keeping most of the contaminants in the air out of the generator.

The high voltage connector is designed in such a way as to not be exposed to the air flow from the distribution fan and the potential contamination on the surface of the connector sleeve.

While my above description contains many specificities, these should not be construed as limitations on the scope of the invention, but rather as an exemplification of one preferred embodiment thereof. Many other variations are possible. For example the hollow high voltage electrode can have a non-rectangular crossectional shape. Accordingly, the scope of the invention should be determined not by the embodiment(s) illustrated, but by the appended claims and their legal equivalents.

LIST OF DRAWINGS

In drawings which illustrate embodiments of the invention,

FIG. 1 is an elevation end view of one embodiment,
FIG. 2 is an elevation side view of this embodiment,
FIG. 3 is a section of the line I—I of FIG. 1,
FIG. 4 is a section of the line II—II of FIG. 2,
FIG. 5 is a section of the line III—III of FIG. 2 and
FIG. 6 is a section of the line IV—IV of FIG. 2.
FIG. 7 is a side view of the high voltage electrode 4.
FIG. 8 is a section of the line V—V of FIG. 7.

REFERENCE NUMERALS IN DRAWINGS

| | |
|---|---|
| 1 generating chamber assembly | 11 tapped outlet hole |
| 2 high voltage connector | 12 tapped inlet hole |
| 3 thermally insulating assembly | 13 spring |
| 4 high voltage electrode | 14 bracket |
| 5 grounded electrode | 15 cordstock "O"-ring |
| 6 dielectric member | 16 U-shaped spring clip |
| 7 spacer | 17 generator frame |
| 8 electrically insulating sleeve | |
| 9 thermally insulating pads | |

-continued

| |
|---|
| 10 insulation holders |

DETAILED DESCRIPTION OF PREFERRED EMBODIMENT

Figure 7:
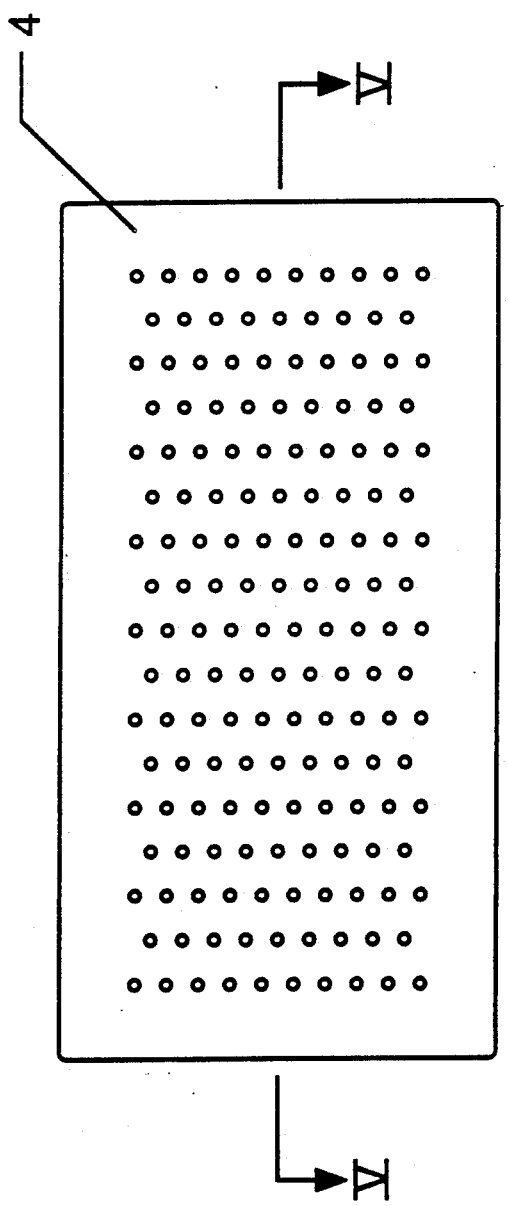

The ozone generator illustrated comprises a generating chamber assembly 1, a high voltage connector 2 and insulating members thermally insulating assemblies 3. The generating chamber assembly is defined by means of a high voltage electrode 4 and grounded electrodes 5, that are also the casing for the generating chamber. The high voltage electrode 4 is a hollow boxlike structure with one end open. In the preferred embodiment as shown in FIG. 7 the sides of the high voltage electrode is made of perforated stainless steel sheets spot welded along the edges to three rectangular bars between them. However the sides can also consist of solid stainless steel sheet material. A dielectric member 6 made of 96% alumina, 0.025" thick is provided against the grounded electrodes on both sides of the generator.

The high voltage electrode is centered inside the generating chamber by means of 4 ceramic spacers 7. The high voltage connector 2 is fed through the housing inside an electrically insulating sleeve 8, made from polytetrafluoroethylene or an equivalent nontracking material. The two thermally insulating members consists of two thermally insulating pads 9, made of polystyrene or an equivalent material and are provided against the outside walls of the generating chamber. The insulating pads are held in place by means of insulation holders 10.

The feed gas is supplied through a fitting threaded into the tapped inlet hole 12, and the ozone produced in the generator is discharged through a fitting threaded into the tapped outlet hole 11. The dielectric elements are held in position be the springs 13 and the brackets 14. The springs 13 are made from fully hardened T301 stainless steel or an equivalent material. Parts 4,5,10 and 14 are made from stainless steel or an equivalent material.

The corners of the generator frame are sealed gas tight by means of the cordstock "O"-rings 15. The generator frame 17 is made from aluminum, stainless steel or an equivalent material and is is sealed gas tight against the side walls of the generating chamber by the use of a closed cell foam gasket made from silicone or an equivalent material, on both sides of the frame 17.

Two U-shaped spring clips 16 made from fully hardened T301 stainless steel or equivalent holds the individual generator parts together.

In installations where the generator does not need to be gas tight, the gaskets and the "O"-rings may be omitted.

From the description above, a number of advantages of my ozone generator become evident:

(a) A temperature increase inside the generating chamber as compared to the feed gas temperature is attained by retaining a certain amount of heat generated in the corona discharge through the use of thermal insulation, and therefore keeping the air above its dew point and reducing the amount of nitric acid which is formed.

In installations where a power source has sufficient voltage and current capability and is operating at a high enough frequency to warrant removal of excess heat, then the two insulating members can be removed so that air cooling can be applied against the outside surface areas of the generating chamber.

(b) An alternate passway for the feed gas is introduced by using a hollow high voltage electrode with perforated sides and an opening on the discharge end. This will reduce the exposure time of the feed gas in the discharge gap and less nitric oxides will have time to form.

(c) An alternate passway for ozone as it is formed in the discharge gap is introduced by using a hollow high voltage electrode with perforated sides and an opening on the generator outlet end. Ozone will still have time to form due to its short formation time constant and the dissociation of ozone due to electron collisions and heat in the discharge gap will be reduced.

(d) A minimum connecting area between the high voltage electrodes exists and nontracking materials such as ceramic and polytetrafluoroethylene are used.

(e) An economical dielectric such as a standard size ceramic substrate without coatings is used.

(f) A generator which is easy to remove, dissassemble clean, reassemble and reinstall without use of threaded fasteners and with easily removable dielectrics is produced.

(g) An ozone generator which will accept a small piped in air flow, but which still is economical to manufacture is produced. The feed gas can then be prefiltered.

(h) A design where the high voltage connector sleeve is protected from the air flow from the distribution fan is used.

(i) An easily manufactured easily dissassembled ozone generator which can be used with seals and gaskets in an air-tight version or as a more economical version by leaving out the seals and gaskets is produced.

OPERATION—FIGS. 3 TO 8

An electrostatic field or corona discharge is created between the electrodes 4 and 5 by connecting an electrical power source to the high voltage connector 2. An exterior air pump is then used to supply air or oxygen though the inlet hole 12 which is then passed on both sides between the high voltage electrode 4 and the dielectric members 6. A small percentage of the oxygen is converted to ozone and pushed out the outlet hole 11.

Figure 8:
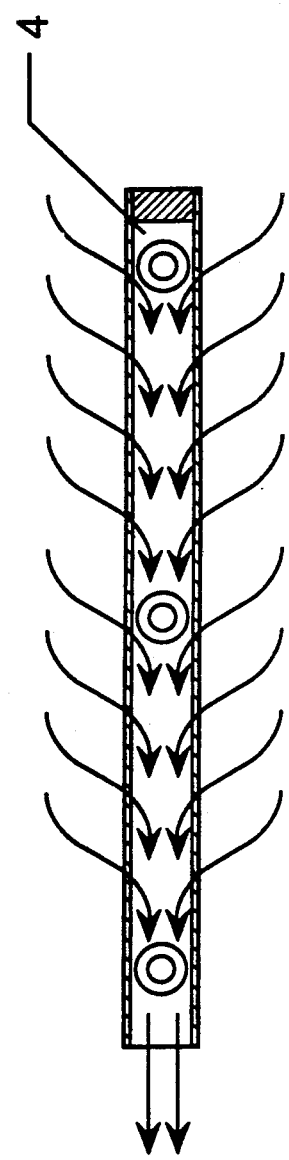

In the preferred embodiment using a high voltage electrode 4 with perforated sides as shown in FIG. 7 the ozone and feed gas mixture in the corona discharge gap will escape into the hollow core of the high voltage electrode 4 through the perforations along the entire length of the electrode as shown in FIG. 8 and then exit through the open end of the electrode and out through the outlet hole 11, less ozone then will have time to dissociate and less nitric acid will have time to form.

When the power level supplied to the generator is too low for a temperature increase inside the generator above the ambient temperature of more than 10 Deg. C. then the thermally insulating members 3 are left installed as shown in FIGS. 1 and 2, otherwise they are removed to allow for air cooling by an exterior distribution fan.

In applications where it is desired to pipe the ozone to the treatment area the generator is made gas tight by installing cordstock "O" rings 15 into the corners of the generator and by installing a closed cell foam gasket made from silicone or an equivalent material on both sides of the frame 17 sealing the frame against the grounded electrodes 5.

The embodiments of the invention in which an exclusive property or privilege is claimed are defined as follows:

1. An ozone generator comprising:
   a. a grounded electrode,
   b. a high voltage electrode,
   c. dielectric members,
   d. spacers connected to a frame supporting said grounded electrode and said high voltage electrode in spaced relation relative to one another with said high voltage electrode in the center position,
   e. said grounded electrode providing support for said frame,
   f. said spacers being chemically inert electrically non-conductive and attached to said frame,
   g. said high voltage electrode having two sides made from sheets of a conductive material joined together with connecting members along the edges whereby a sufficiently wide space is provided between the sides of said grounded electrodes to allow for said spacers to be insulated due to the hollow construction of said high voltage electrode,
   h. means of holding said dielectric members in place against the inside surfaces of said grounded electrodes,
   i. said dielectric members facing the high voltage electrode,
   j. said high voltage electrode being connected to an electrical power source by means of a conductive connector and said grounded electrodes being connected to ground whereby an electrostatic field is created between said dielectric members and said high voltage electrode,
   k. means for passing feed gas through said electrostatic field to discharge the ozone produced in said electrostatic field from the generator,
   l. means for holding the sides of said grounded electrode in a spaced relation relative to said high voltage electrode.

2. The ozone generator of claim 1 wherein said high voltage electrode have sides with holes through the material joined together with connecting members on three sides leaving the outlet end open whereby said feed gas and formed ozone can exit from said electrostatic field before dissociation of ozone and formation of nitric acid takes place.

3. The ozone generator of claim 1 wherein said conductive connector comprises a rod that is encased inside a sleeve made from a chemically inert electrically non-conductive material whereby surface tracking is kept to a minimum since the opposite voltage potentials are not connected with a large surface area.

4. The ozone generator of claim 1 wherein said means for holding the sides of said grounded electrode in a spaced relation relative to said high voltage electrode is arranged without the use of threaded fasteners whereby dissassembly and cleaning is made convenient.

5. The ozone generator of claim 4 wherein said means for holding said sides of said grounded electrode in a spaced relation relative to said high voltage electrode consists of two spring clips shaped into u shape.

6. The ozone generator of claim 1 further including thermally insulating members held against the outside walls of the generator whereby due to an increase in temperature and consequent lower relative humidity less nitric acid is formed.

7. The ozone generator of claim 6 wherein said insulating members comprises a foamed plastics material which is clamped against the outside walls of the generator by means of stainless steel holders.

8. The ozone generator of claim 1 further including seal means to make the generator assembly gas tight whereby ozone can be piped to the application area.

9. The ozone generator of claim 8, in which said seals consisting of cord stock "O"-rings made from a chemically inert material has been added to the corners of the generator frame and a gasket made from a chemically inert material has been added to both sides of the generator frame in order to make it gas tight.

10. The ozone generator of claim 1, wherein neither of the electrodes is connected to ground potential.

11. An ozone generator comprising:
 a. a grounded electrode,
 b. a high voltage electrode,
 c. dielectric members,
 d. spacers connected to a frame supporting said grounded electrode and said high voltage electrode in spaced relation relative to one another with said high voltage electrode in the center position,
 e. said grounded electrode providing support for said frame,
 f. said spacers being chemically inert electrically nonconductive and attached to said frame,
 g. said high voltage electrode constructed in the shape of a hollow box made from a conductive material whereby a sufficiently wide space is provided between the sides of said grounded electrode to allow for said spacers to be insulated due to the hollow construction of said high voltage electrode,
 h. means of holding said dielectric members in place against the inside surfaces of said grounded electrode,
 i. said dielectric members facing the high voltage electrode,
 j. said high voltage electrode being connected to an electrical power source by means of a conductive connector and said grounded electrodes being connected to ground whereby an electrostatic field is created between said dielectric members and said high voltage electrode,
 k. means for passing feed gas through said electrostatic field to discharge the ozone produced in said electrostatic field from the generator,
 l. means for holding the sides of said grounded electrode in a spaced relation relative to said high voltage electrode.

12. The ozone generator of claim 11 wherein said high voltage electrode have sides with holes through the material and the outlet end open whereby said feed gas and formed ozone can exit from said electrostatic field before dissociation of ozone and formation of nitric acid takes place.

13. The ozone generator of claim 11 wherein said conductive connector comprises a rod that is encased inside a sleeve made from a chemically inert electrically nonconductive material whereby surface tracking is kept to a minimum since the opposite voltage potentials are not connected with a large surface area.

14. The ozone generator of claim 11 wherein said means for holding the sides of said grounded electrode in a spaced relation relative to said high voltage electrode is arranged without the use of threaded fasteners whereby dissassembly and cleaning is made convenient.

15. The ozone generator of claim 14 wherein said means for holding said sides of said grounded electrode in a spaced relation relative to said high voltage electrode consists of two spring clips shaped into u shape.

16. The ozone generator of claim 11 further including thermally insulating members held against the outside walls of the generator whereby due to an increase in temperature and consequent lower relative humidity less nitric acid is formed.

17. The ozone generator of claim 16 wherein said insulating members comprises a foamed plastics material which is clamped against the outside walls of the generator by means of stainless steel holders.

18. The ozone generator of claim 11 further including seal means to make the generator assembly gas tight whereby ozone can be piped to the application area.

19. The ozone generator of claim 18, in which said seals consisting of cord stock "O"-rings made from a chemically inert material has been added to the corners of the generator frame and a gasket made from a chemically inert material has been added to both sides of the generator frame in order to make it gas tight.

20. The ozone generator of claim 11, wherein neither of the electrodes is connected to ground potential.

* * * * *